United States Patent
Hsiao et al.

(10) Patent No.: US 8,668,131 B2
(45) Date of Patent: Mar. 11, 2014

(54) IN-SITU ACCURACY CONTROL IN FLUX DIPPING

(75) Inventors: Yi-Li Hsiao, Hsin-Chu (TW); Chen-Hua Yu, Hsin-Chu (TW); Chung-Shi Liu, Hsin-Chu (TW); Chien Ling Hwang, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 312 days.

(21) Appl. No.: 13/031,040

(22) Filed: Feb. 18, 2011

(65) Prior Publication Data

US 2012/0211547 A1 Aug. 23, 2012

(51) Int. Cl.
*B23K 3/08* (2006.01)
*B23K 1/20* (2006.01)

(52) U.S. Cl.
USPC ........ 228/36; 228/8; 228/19; 228/22; 228/33; 228/223

(58) Field of Classification Search
USPC ............... 228/8, 19, 22, 33–41, 207, 223
See application file for complete search history.

(56) References Cited

U.S. PATENT DOCUMENTS

| 5,074,455 A * | 12/1991 | Peana et al. | 228/35 |
| 6,789,720 B2 * | 9/2004 | Uchida et al. | 228/22 |
| 6,957,759 B2 * | 10/2005 | Uchida et al. | 228/22 |
| 2010/0163606 A1 * | 7/2010 | Sato et al. | 228/223 |
| 2011/0143544 A1 * | 6/2011 | Goto et al. | 438/703 |

FOREIGN PATENT DOCUMENTS

WO  WO 2008108441 A1 * 9/2008

* cited by examiner

*Primary Examiner* — Devang R Patel
(74) *Attorney, Agent, or Firm* — Slater & Matsil, L.L.P.

(57) ABSTRACT

A flux dipping apparatus includes a flux plate having a top surface; and a dipping cavity in the flux plate and recessed from the top surface. A flux leveler is disposed over the flux plate and configured to move parallel to the top surface. A piezoelectric actuator is configured to adjust a distance between the flux leveler and the top surface in response to a controlling voltage applied to electrodes of the first piezoelectric actuator.

16 Claims, 9 Drawing Sheets

IN-SITU ACCURACY CONTROL IN FLUX DIPPING

BACKGROUND

In the manufacturing of integrated circuits, dies are often bonded to other package components. To bond a die, solder bumps are first formed on the surface of the die. The solder bumps are then dipped in flux. Conventionally, the flux dipping is performed using a flux plate including a dipping cavity, which has the size of the die. Flux is held in the dipping cavity, and the die is dipped in the dipping cavity with the solder bumps facing down.

Conventionally, the dip height, that is, the height of the portions of the solder bumps dipped in the flux, is controlled by selecting the depth of the dipping cavity. To add flux into the dipping cavity after each dipping, a flux bowl is used. The flux bowl is a metal frame, with the bottom edge of the metal frame contacting the flux plate. The metal frame may have a rectangular top-view shape. The flux bowl is bottomless, and the flux is held in the flux bowl. Accordingly, the flux in the flux bowl also contacts the flux plate. To add the flux into the dipping cavity, the flux bowl slides over the dipping cavity, and hence the flux in the flux bowl falls into the dipping cavity. Excess flux is swept away by the flux bowl during the movement of the flux bowl, and hence the flux left in the dipping cavity has a top surface level with the top surface of the flux plate, and level with the bottom surface of the metal frame.

Since the dipping cavity has a fixed depth, if the dip height needs to be adjusted, the plate that is being used has to be replaced by a plate with a dipping cavity having a different depth. Furthermore, there is no way to accurately control the profile of the flux.

There are also other dipping plates having different shapes. For example, there are some disk-shaped plates, wherein the disk-shaped plates rotate along an axis during the flux dipping processes. Again, dipping cavities are located in the disks to hold the flux. Similarly, these types of flux plates cannot be used in the advanced control of the dipping process due to the fixed depth in the dipping cavities.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

A novel apparatus for flux dipping and the method for filling the flux into a dipping cavity are provided in accordance with an embodiment. The variations and the operation of the embodiment are discussed. Throughout the various views and illustrative embodiments, like reference numbers are used to designate like elements.

Figure 1:
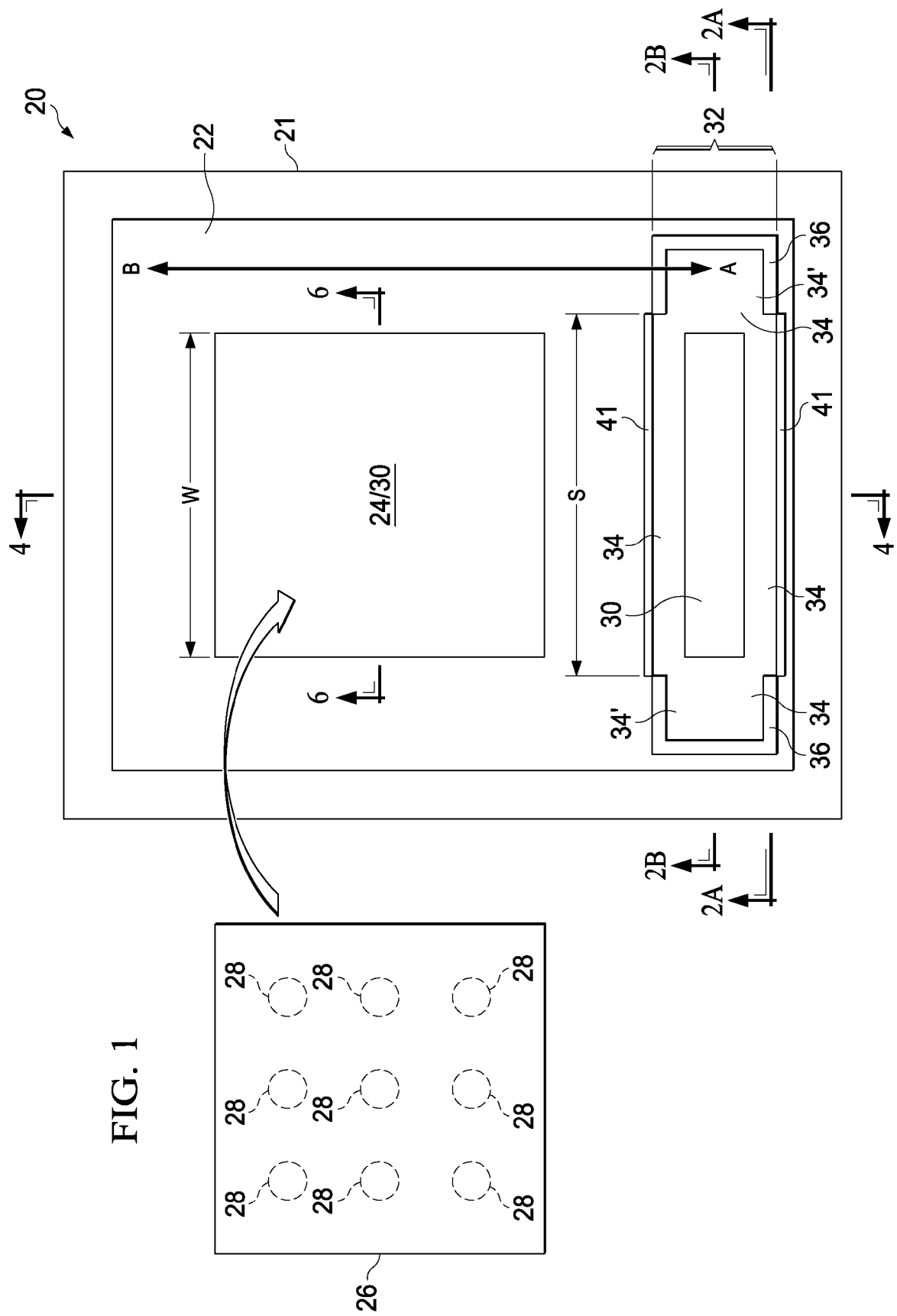
FIG. 1 illustrates an apparatus for flux dipping, wherein the flux is added into a dipping cavity using a flux bowl.

FIG. 1 illustrates a top view of flux dipping apparatus 20. Flux dipping apparatus 20 includes flux plate 21, which has flat top surface 22, and flux bowl 32. Dipping cavity 24 is recessed from flat top surface 22 (please also refer to FIGS. 2C and 2D). The size of dipping cavity 24 may be slightly larger than die 26 that will be dipped in dipping cavity 24. Die 26 is schematically illustrated, wherein solder bumps 28 are located on a surface of die 26. When the dipping is performed, die 26 is picked up and placed into dipping cavity 24, so that solder bumps 28, which face toward dipping cavity 24, is submerged in flux 30 that is held in dipping cavity 24.

After a dipping is performed, dipping cavity 24 is refilled for the dipping of the next die. The filling of flux 30 into dipping cavity 24 is performed using flux bowl 32, which includes metal frame 34 for holding flux 30. Metal frame 34 also acts as a flux leveler since when flux bowl 32 passes over dipping cavity 24, the bottom surface 34A (not shown in FIG. 1, please refer to FIGS. 2A through 2D) of metal frame 34 has the function of leveling flux 30, and removing excess flux 30. In the illustrated embodiment as shown in FIG. 1, metal frame 34 has a rectangular top-view shape, and has four sides forming a ring encircling flux 30. In alternative embodiments, metal frame 34 may have other shapes such as an ellipse top-view shape. Metal frame 34 has the shape of a bottomless basin, and flux 30 is in contact with flat top surface 22 of flux plate 21. Attached to the metal frame 34 are movable foot sections 36 (please also refer to FIGS. 2A through 2D.) It is noted that the top view in FIG. 1 is obtained from the plane crossing line 1-1 in FIG. 2B. Distance S (FIG. 1) between foot sections 36 is greater than, and may be close to, width W of dipping cavity 24.

Figure 2A:
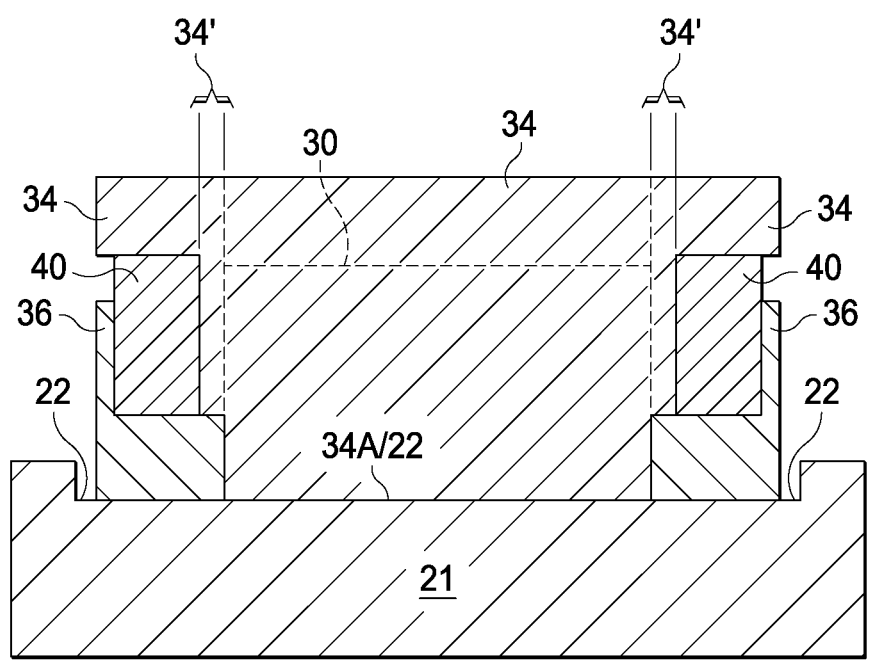
FIGS. 2A through 2D are cross-sectional views of the apparatus shown in FIG. 1.
Figure 2B:
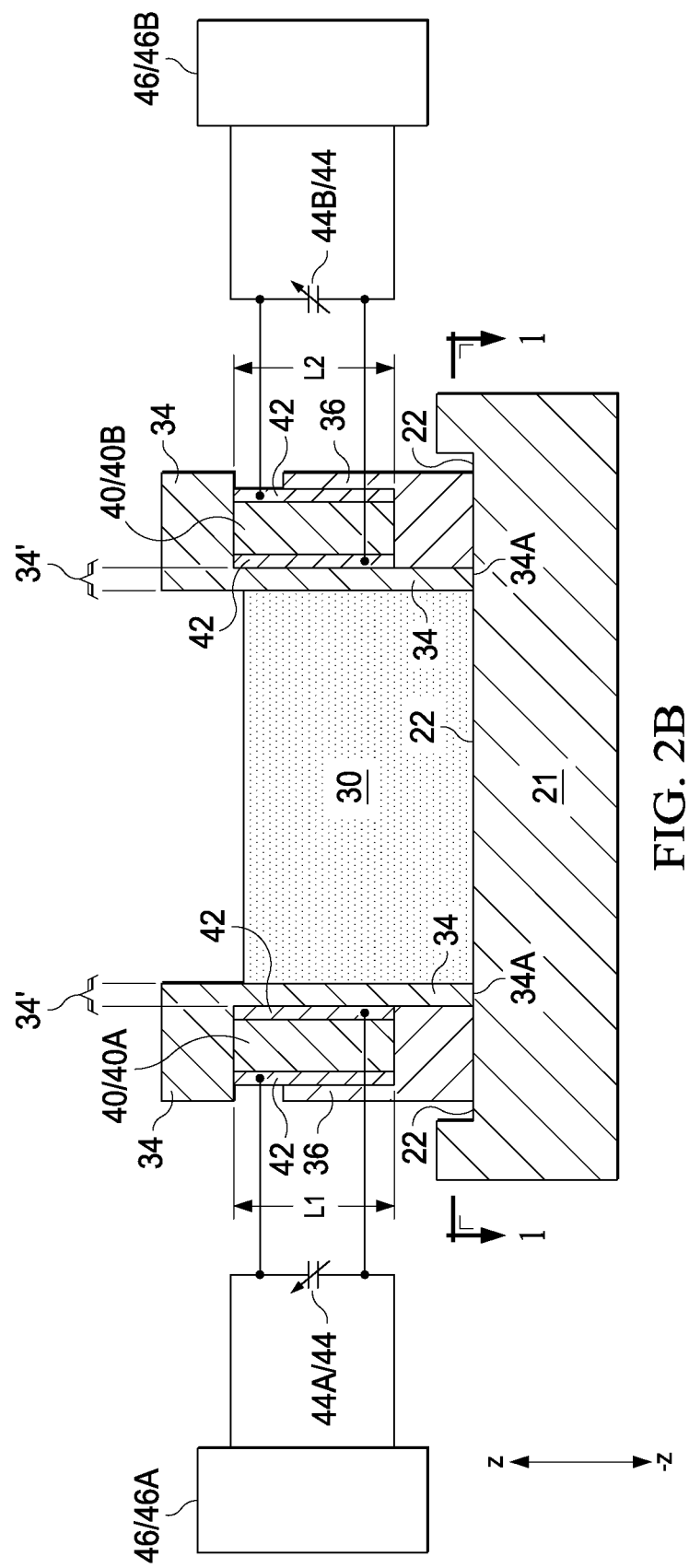

FIGS. 2A through 2D are cross-sectional views of the apparatus shown in FIG. 1. FIGS. 2A and 2B illustrate the cross-sectional views obtained from the planes crossing line 2A-2A and 2B-2B, respectively, in FIG. 1. It is shown that flux bowl 32 includes metal frame 34, which further includes an inner portion(s) 34' contacting flux 30. Piezoelectric actuators 40 are formed on the outer side of inner portions 34', and may be directly over, and possibly contacting, portions of foot sections 36. Piezoelectric actuators 40 may also be directly under, and possibly contacting, outer portions of metal frame 34. Electrodes 42 (please refer to FIG. 2B) may be formed on the inner side and the outer side of each of piezoelectric actuators 40, and are connected to voltage source(s) 44 (illustrated as 44A and 44B). Voltage sources 44 are configured to output voltages to electrodes 42. Voltage sources 44 may be further connected to, and controlled by, voltage controller(s) 46 (illustrated as 46A and 46B), which determine the voltage levels that should be provided to electrodes 42. Although voltage controllers 46 are shown as including 46A and 46B, voltage controllers 46A and 46B may also be combined into a single voltage controller that has two outputs. Furthermore, voltage sources 44A and 44B may be combined into a single voltage source that has two outputs.

As shown in FIGS. 2A and 2B, foot sections 36 (also see FIG. 1) are attached to piezoelectric actuators 40. There may be two piezoelectric actuators 40 and two foot sections 36 located on opposite sides (referred to as being a left side and a right side hereinafter) of metal frame 34. Foot sections 36 and piezoelectric actuators 40 are further attached to metal frame 34. In an exemplary embodiment, each of foot sections 36 includes a portion directly under the corresponding piezoelectric actuators 40, while metal frame 34 includes outer portions that are directly over and possibly contact piezoelectric actuators 40. Piezoelectric actuators 40 are allowed to extend and to contract in the directions (+Z and −Z directions as shown in FIG. 2B) perpendicular to flat top surface 22. In response to the extension and the contraction of piezoelectric actuators 40, metal frame 34 may be pushed up or allowed to drop, and may make movements in the +Z and −Z directions.

Figure 3:
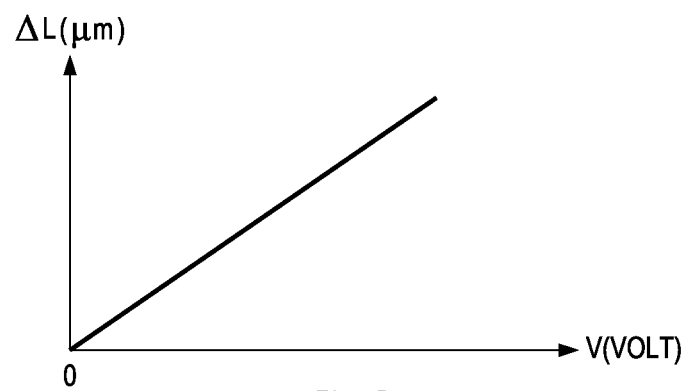
FIG. 3 schematically illustrates a change in a length of a piezoelectric actuator incorporated in the apparatus, wherein the change in length is illustrated as a function of a voltage applied to electrodes of the piezoelectric actuator.

Piezoelectric actuators 40 are formed of a piezoelectric material. Accordingly, when applied with voltages (through electrodes 42 as shown in FIG. 2B), their lengths in the Z directions change. FIG. 3 illustrates the change in length ΔL of one of piezoelectric actuators 40 as a function of voltage V applied to the respective electrodes 42. It is observed that the change in length ΔL is linear to the applied voltage V. Furthermore, value ΔL is proportional to the respective lengths L1 and L2 (FIG. 2B) of piezoelectric actuators 40, wherein lengths L1 and L2 are measured when the applied voltages are 0V (no voltage is applied). Length L1 may be equal to length L2. When different voltages are applied to electrodes 42, the lengths L1 and L2 of piezoelectric actuators 40 may be changed accordingly. Furthermore, if different voltages are applied to the left-side and right-side piezoelectric actuators 40, lengths L1 and L2 may be changed to different values even if they are originally the same.

Figure 2C:
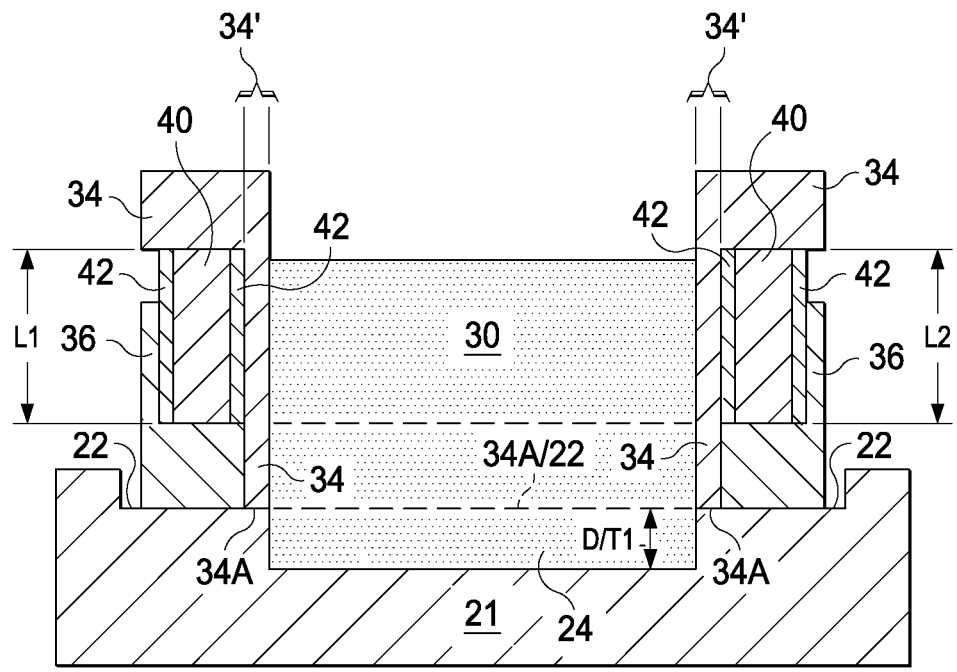
Figure 2D:
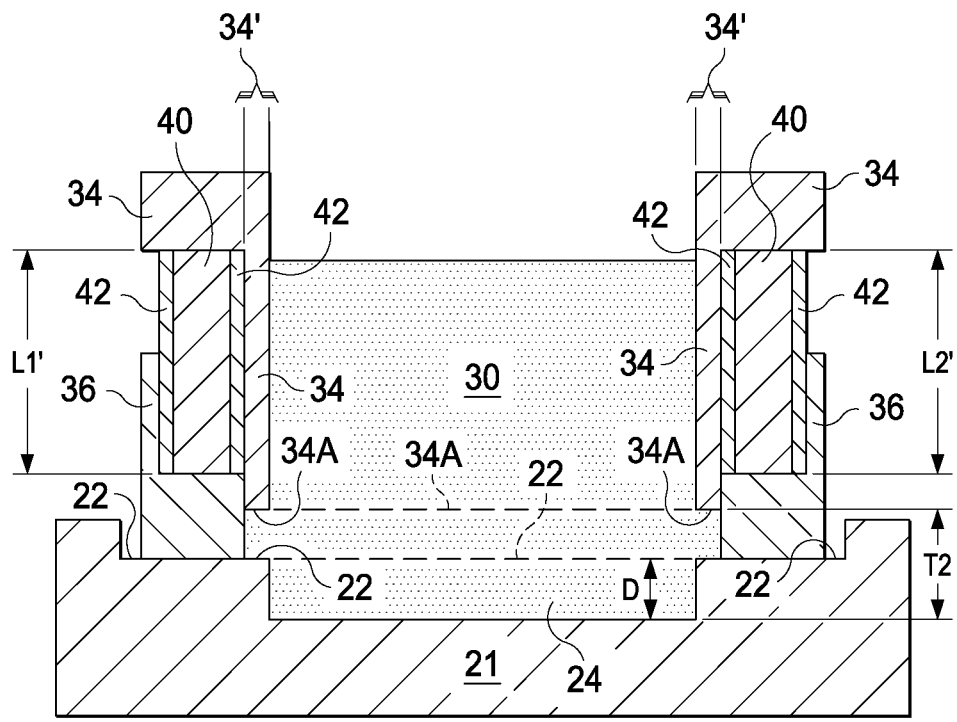

As shown in FIG. 2B, when no voltages are applied, bottom surface 34A of metal frame 34 contacts flat surface 22. However, when the voltages applied to electrodes 42 increase, lengths L1 and L2 increase to L1' and L2' (FIG. 2D), respectively. Accordingly, as shown in FIG. 2D, metal frame 34 is pushed up by piezoelectric actuators 40, and bottom surface 34A of metal frame 34 is higher than flat top surface 22. When bottom surface 34A of metal frame 34 is lifted higher than flat surface 22, foot sections 36 remain contacting flat top surface 22.

Referring back to FIG. 1, after the dipping of one die is finished, flux bowl 32 may slide on flat surface 22 along the path extending from point A to point B, wherein the respective path is referred to as A-to-B path hereinafter. After reaching point B, flux bowl 32 may slide back along the B-to-A path. Each of the A-to-B path and the B-to-A path is also referred to as being a brush. FIGS. 2C and 2D illustrate the cross-sectional views of flux dipping apparatus 20, wherein the cross-sectional views are obtained from the plane crossing line 5A/5B-5A/5B, except when the cross-sectional views are obtained, flux bowl 32 is directly over dipping cavity 24.

FIG. 2C illustrates the situation wherein voltage V applied to electrodes 42 is 0V. Accordingly, bottom surface 34A is level with flat top surface 22. Flux 30 thus falls into, and fills, dipping cavity 24. After flux bowl 32 passes over dipping cavity 24, metal frame 34 wipes away the excess flux that is over dipping cavity 24, and the remaining flux 30 in dipping cavity 24 has a top surface level with flat surface 22. Thickness T1 of flux 30 that is filled into dipping cavity 24 is thus equal to depth D of dipping cavity 24.

FIG. 2D illustrates the situation when voltages V applied to electrodes 42 are greater than 0V. Accordingly, bottom surface 34A (dotted line) is higher than flat surface 22. After flux bowl 32 passes over dipping cavity 24, metal frame 34 wipes away excess flux over dipping cavity 24, and the remaining flux 30 in dipping cavity 24 has a top surface level with bottom surface 34A of metal frame 34. Accordingly, the top surface of the refilled flux 30 is higher than flat surface 22 of plate 21. Since flux 30 has a relatively high viscosity, when bottom surface 34A of metal frame 34 is elevated, flux 30 will not flow out immediately, and before flux 30 flows out substantially, metal frame 34 is back to contact with flat surface 22 again. As shown in FIG. 2D, when voltages are applied to piezoelectric actuators 40, thickness T2 of the filled flux 30, which includes a portion in dipping cavity 24 and a portion directly over dipping cavity 24, is greater than depth D of dipping cavity 24. In the illustrated embodiments, thickness T2 of flux 30 equals D+ΔL, wherein ΔL is the extension ((L1'−L1) and/or (L2'−L2)) of piezoelectric actuators 40, and is proportional to the voltage applied to piezoelectric actuators 40.

Figure 4:
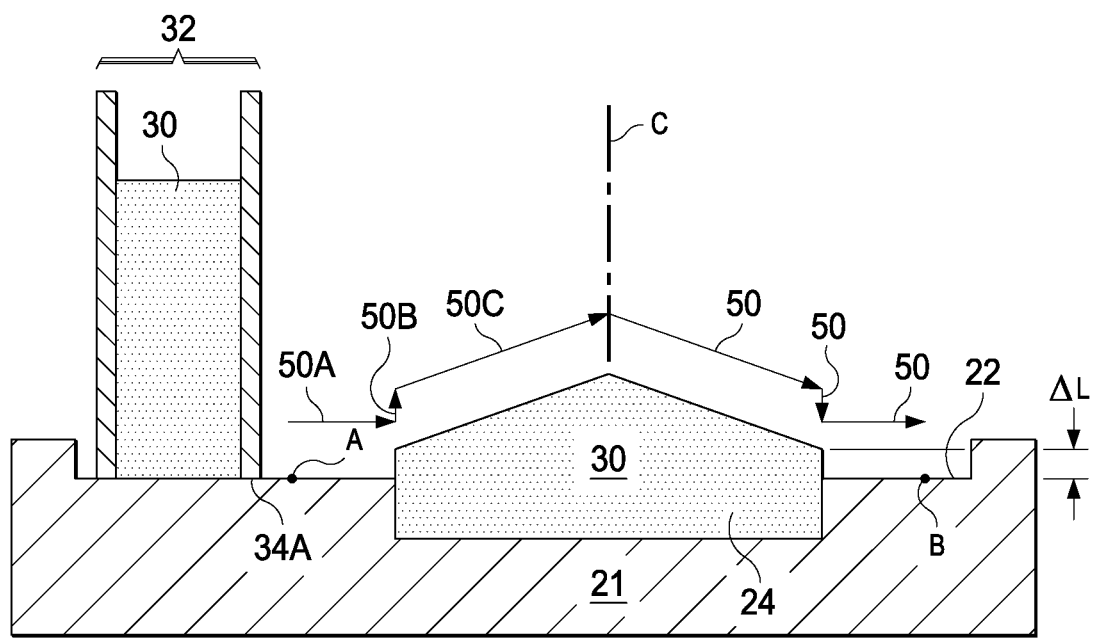
FIG. 4 illustrates exemplary profiles achieved by adjusting the voltage applied to the piezoelectric actuator.

FIG. 4 illustrates a cross-sectional view obtained from the plane crossing line 4-4 in FIG. 1. Arrows 50 (including sections 50A, 50B, and 50C) illustrate one of the various likely tracks of flux bowl 32. First, flux bowl 32 slides along the A-to-B path. During section 50A, flux bowl 32 slides from left to right, wherein no voltages are applied to piezoelectric actuators 40 (not shown in FIG. 4, please refer to FIGS. 2A through 2C). In section 50B, voltages are applied, and bottom surface 34A of metal frame 34 is quickly raised by height ΔL. In section 50C (during which flux bowl 32 is directly over dipping cavity 24), the voltages gradually increase when the sliding of flux bowl 32 proceeds. Accordingly, bottom surface 34A of metal frame 34 gradually elevates. When reaching center point C, the voltages may gradually decrease when the sliding of flux bowl 32 further proceeds, until flux bowl 32 is no longer directly over flux cavity 24. The voltages may then be reduced to zero volt, and flux bowl 32 glides to point B. In the reversed path B-to-A, a reversed voltage application may be performed to maintain the shape of flux 30, wherein the top surface of flux 30 is the highest in the middle point C, and is the lowest close to edges of flux bowl 32.

Figure 5A:
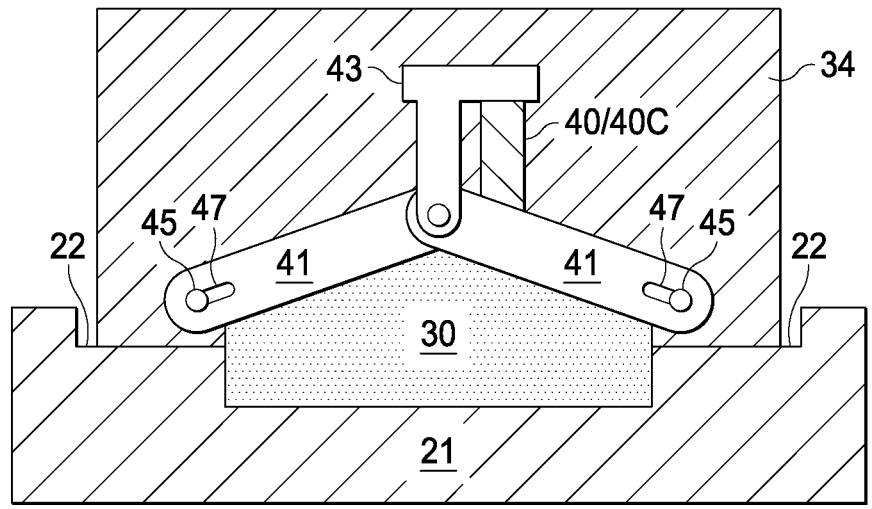
FIGS. 5A through 5C illustrate side views of a central piezoelectric actuator and the respective connecting flux levelers.
Figure 5B:
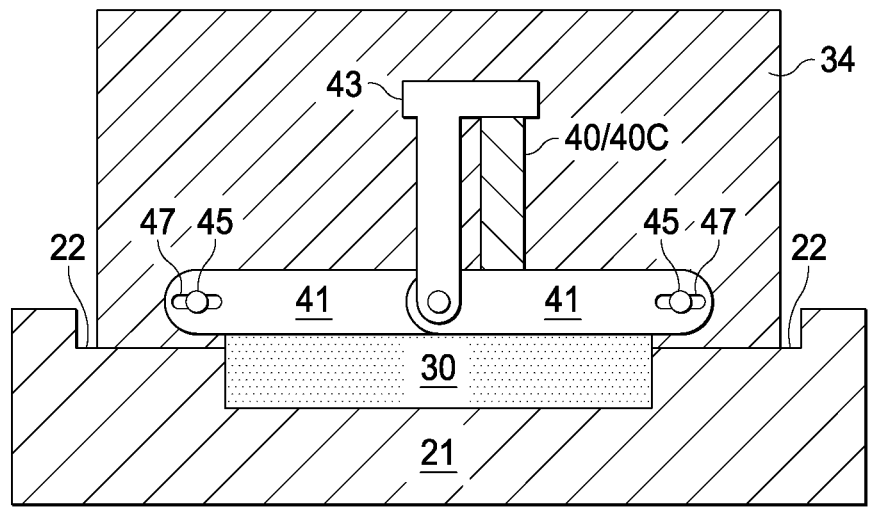
Figure 5C:
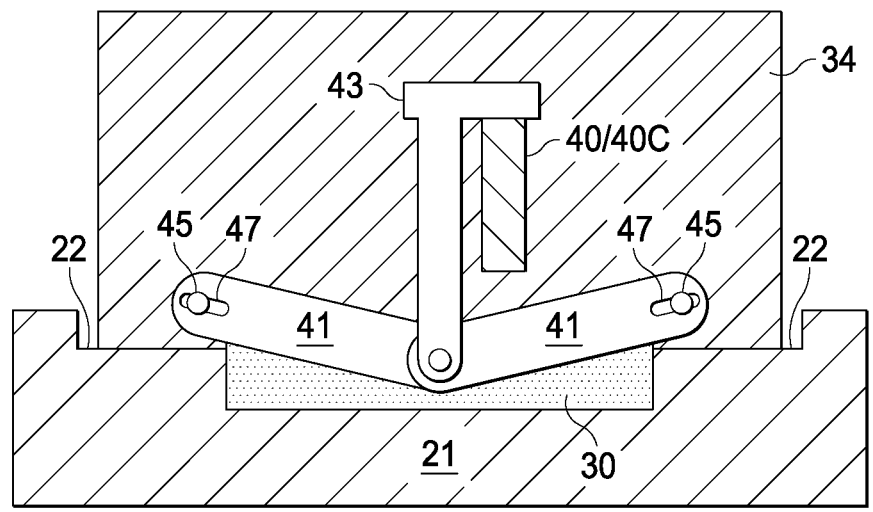

FIGS. 5A, 5B, and 5C illustrate side views of additional flux levelers 41 and the respective additional piezoelectric actuator(s) 40 that are attached to the long side(s) of metal frame 34. The top view of flux levelers 41 is also shown in FIG. 1. Electrodes 42 and the respective voltage sources are not shown, and may be similar to what are shown in FIG. 2B. Furthermore, details of other piezoelectric actuator 40 and flux bowl 32 are also not shown, and may be found in FIGS. 1 through 2D. Throughout the description, the additional piezoelectric actuator 40 is referred to as central piezoelectric actuator 40C. In an embodiment, as shown in FIG. 1, two flux levelers 41 are formed on opposite sides of metal frame 34, with flux levelers 41 having longwise directions perpendicular to the A-to-B direction as shown in FIG. 1. In alternative embodiments, flux levelers 41 are formed on one side, but not both sides, of metal frame 34.

Referring again to FIGS. 5A, 5B, and 5C, flux levelers 41 includes two portions (also referred to as two levelers 41), each have a first end hold onto position by fixed axis 45, which are fixed on metal frame 34. Flux levelers 41 may slide toward left or right slightly, and may rotate slightly. This may be achieved by holding fixed axis 45 in guiding openings 47, which allow fixed axis 45 to glide in guiding openings 47. The second end of each portion of levelers 41 is connected to movable arm 43, which is further attached to central piezoelectric actuator 40C. The top end of central piezoelectric actuator 40C is connected to movable arm 43. The bottom end of central piezoelectric actuator 40C may be fixed on metal frame 34. Accordingly, by applying a high voltage to central piezoelectric actuator 40C, the length of central piezoelectric actuator 40C increases, and movable arm 43 moves up slightly. Flux levelers 41 are thus in the position as shown in FIG. 5A. Reducing the voltage applied to central piezoelectric actuator 40C, flux levelers 41 may be in the position as shown in FIG. 5B, wherein flux levelers 41 are leveled, and are parallel to flat top surface 22 of flux plate 21. When a small voltage or no voltage is applied, flux levelers 41 may be in the position as shown in FIG. 5C, wherein the top surface of the resulting flux 30 has a central portion lower then edge portions.

Figure 6A:
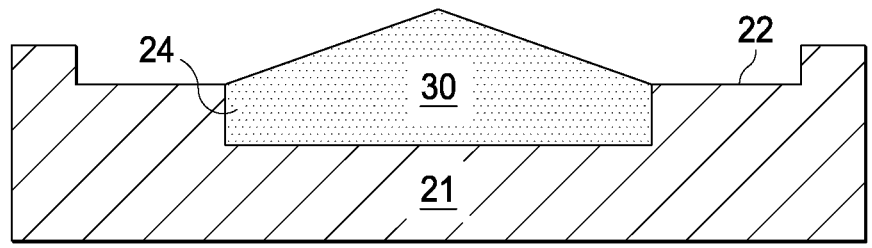
FIG. 6A through 6D illustrate exemplary top surface profiles of the flux achieved by adjusting the voltages applied to the piezoelectric actuators.
Figure 6B:
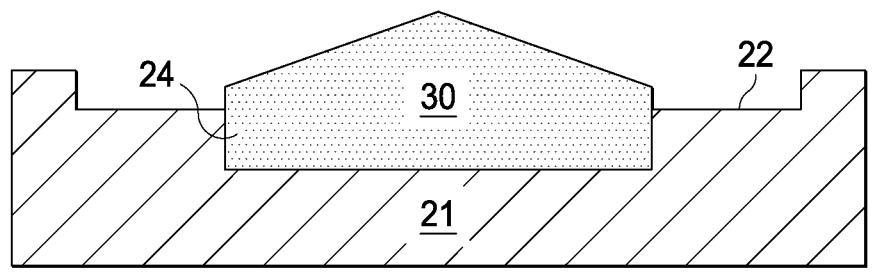
Figure 6C:
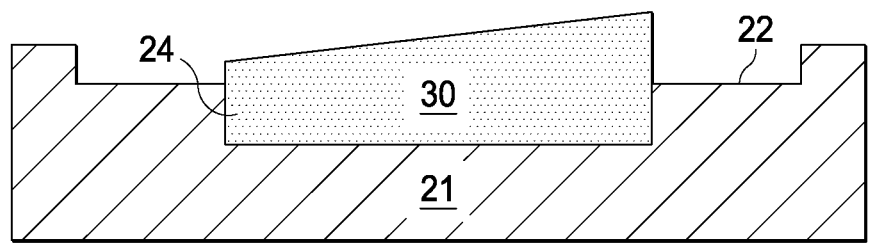
Figure 6D:
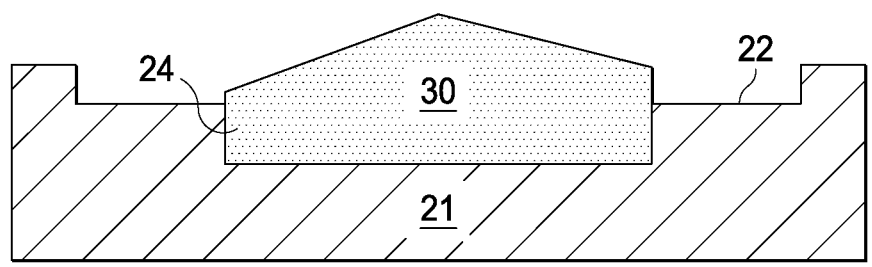

The shaping of flux 30 may also be performed by applying different voltages on the left-side, right-side, and central piezoelectric actuators 40. FIGS. 6A through 6D illustrate exemplary top surface profiles of flux 30, which are obtained after flux bowl 32 glides in the A-to-B and/or B-to-A paths as in FIG. 1. FIGS. 6A through 6D are cross-sectional views obtained from the plane crossing line 6-6 in FIG. 1. In FIG. 6A, a high voltage is applied to central piezoelectric actuator (s) 40, and hence levelers 41 are in the position as shown in FIG. 5A. No voltages are applied to left-side and right side piezoelectric actuators 40. Accordingly, after flux bowl 32 glides along paths A-to-B and/or B-to-A as shown in FIG. 1, the profile of flux 30 as shown in FIG. 6A is formed, wherein the central portion of the top surface of flux 30 is higher than that of edge portions, which edge portions have top surfaces substantially level with flat top surface 22. Alternatively, as FIG. 6B, voltages are applied to the left-side, right-side, and central piezoelectric actuators 40, and hence both the central portion and the edge portions of flux 30 have top surfaces higher than flat top surface 22. In FIG. 6C, levelers 41 have a profile as shown in FIG. 5B, and right-side piezoelectric actuator 40 is applied with a voltage higher than left-side piezoelectric actuator 40. In FIG. 6D, levelers 41 have a position as shown in FIG. 5A, and right-side piezoelectric actuator 40 is applied with a voltage higher than left-side piezoelectric actuator 40. It is realized that FIGS. 6A through 6D are merely examples, and by combining the operations of left-side, right-side, and central piezoelectric actuators 40, more profiles of flux 30 may be achieved.

Combining the flux shaping methods as shown in FIGS. 4 and 6A through 6D, flux 30 may be shaped to have different shapes, for example, with a pyramid top surface. Accordingly, an accurate feed forward control and an accurate feedback control may be performed. For example, in an initial stage of die dipping process, a desirable thickness and a desirable profile of flux may be pre-determined, and are fed forward to controllers 46 (FIG. 2B), which control voltage sources 44 to generate appropriate voltages for the control of piezoelectric actuators 40. Accordingly, the resulting refilled flux has the desirable thickness and desirable profile. After a die is dipped, the die may be measured to check the dipping uniformity and the profile of the flux on the die. The checking results may be fed back to controllers 46 to adjust the subsequent flux filling processes.

Figure 7A:
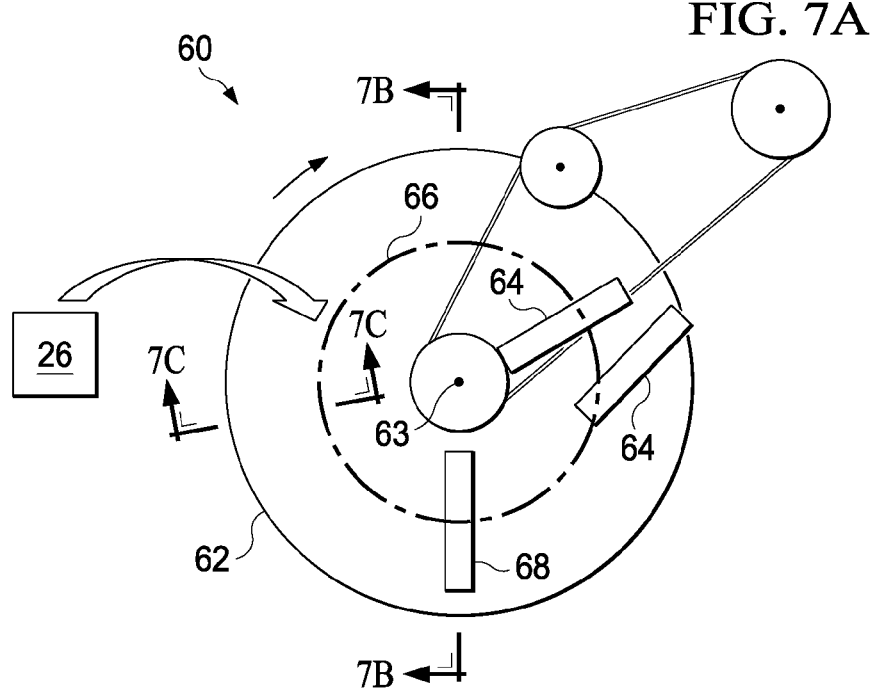
FIGS. 7A through 7C illustrate a top view and cross-sectional views of a disk-type flux dipping apparatus.
Figure 7B:
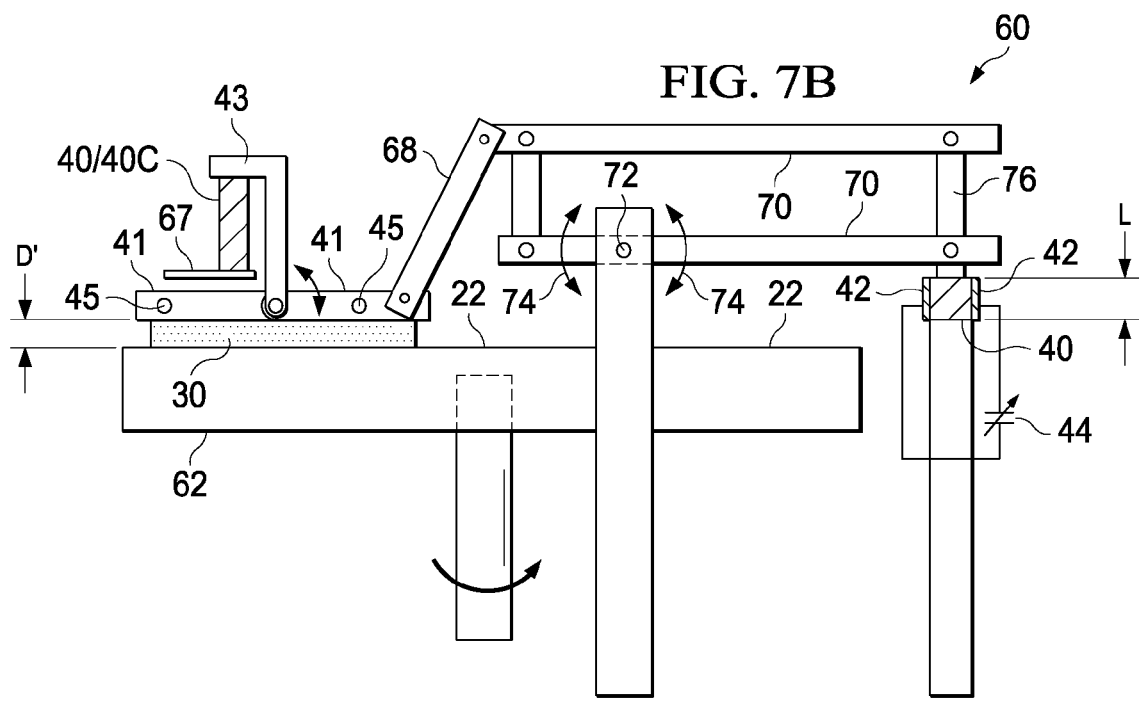
Figure 7C:
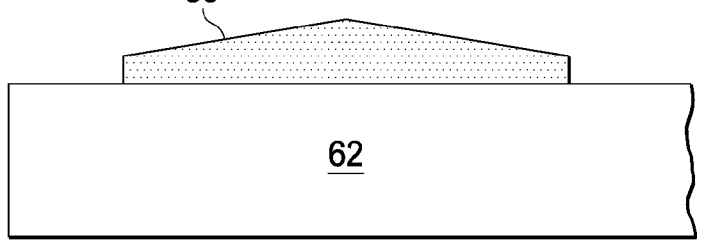

Piezoelectric actuators 40 may be used on various types of dipping apparatuses such as disk-type dipping apparatuses. FIGS. 7A through 7C illustrate a top view and cross-sectional views, of dipping apparatus 60. Dipping apparatus 60 includes flux plate 62 having flat surface 22 (refer to FIG. 7B). Flux plate 62 is rotated, for example, clockwise along axis 63, although it can also be rotated counter clockwise. Flux plate 62 is also referred to disk 62 hereinafter due to its disk shape. Flux 30 (FIG. 7B) is disposed on disk 62. During the rotation of disk 62, blades 64, which are located above disk 62, may push flux 30 to center line 66 of plate 62. Flux leveler 68 is located over disk 62, with a desirable distance D' (refer to FIG. 7B) between flux leveler 68 and flat top surface 22 of disk 62. Accordingly, during the rotation of disk 62, flux leveler 68 may level flux 30 to a desirable thickness, wherein excess flux 30 is blocked to a side (for example, the right side in FIG. 7A) of flux leveler 68. The die dipping may be performed by allowing die 26 to contact flux 30.

FIG. 7B illustrates a cross-sectional view of the structure shown in FIG. 7A, wherein the cross-sectional view is obtained from the plane crossing line 7B-7B in FIG. 7A. Piezoelectric actuator 40 is coupled mechanically to arms 70, which arms can move up and down slightly (as shown as arrows 74) around axis 72. When different voltages are applied to electrodes 42, length L of piezoelectric actuator 40 changes, and pole 76 is pushed up. Accordingly, arms 70 are moved. The amount of the movement depends on the change in length ΔL of piezoelectric actuator 40. As a result of the movement, flux leveler 68 is either raised or lowered, resulting in the change in thickness D' of flux 30.

FIG. 7B also illustrates central piezoelectric actuator 40 and levelers 41. In this embodiment, levelers 41 may replace the flat flux leveler 68. Central piezoelectric actuator 40C may have its bottom attached to a fixed surface 67. The operation of piezoelectric actuator 40 and the respective connecting levelers 41 may be essentially the same as illustrated in FIGS. 5A, 5B, and 5C. Accordingly, by applying different voltages on central piezoelectric actuator 40, movable arm 43 may move up or down, causing the position of levelers 41 to change, as shown in FIGS. 5A through 5C. The top surface profile of flux 30 on disk 62 thus changes accordingly.

FIG. 7C illustrates a cross-sectional view obtained from the plane crossing line 7C-7C in FIG. 7A. The cross-sectional view may be obtained from die 26 contacts flux 30. It is observed that the top surface of flux 30 may have a central portion higher than edge portions. Alternatively, by adjusting the voltage applied to central piezoelectric actuator 40, the top surface of flux 30 may have a substantially flat top surface, or have a top surface with a central portion lower than edge portions.

The flux control method provided by the embodiments is an in-situ control method, wherein the when the thickness of flux needs to be changed, the flux plate or disk does not need to be replaced. Therefore, the forward and backward controls are made feasible.

In accordance with embodiments, a flux dipping apparatus includes a flux plate having a top surface; and a dipping cavity in the flux plate and recessed from the top surface. A flux leveler is disposed over the flux plate and configured to move parallel to the top surface. A piezoelectric actuator is configured to adjust a distance between the flux leveler and the top surface in response to a controlling voltage applied to electrodes of the first piezoelectric actuator.

In accordance with other embodiments, a flux dipping apparatus includes a flux plate having a flat top surface; and a dipping cavity in the flux plate and recessed from the flat top surface. A flux bowl is disposed over the flux plate. The flux bowl has a metal frame having a bottom edge, wherein the metal frame does not have a bottom to isolate a flux held by the metal frame from contacting the flat top surface. A piezoelectric actuator is mounted on the metal frame, wherein the piezoelectric actuator is configured to extend in length in response to a controlling voltage applied to electrodes of the piezoelectric actuator, and wherein the length is measured in a direction perpendicular to the flat top surface. A foot section of the flux bowl contacts the flat top surface. The piezoelectric actuator is configured to move the metal frame in the direction.

In accordance with yet other embodiments, a method includes filling a flux into a dipping cavity in a flux plate; wiping the flux using a flux leveler to adjust a thickness of the flux; and adjusting a distance between the flux leveler and the flux plate by adjusting a controlling voltage applied to a piezoelectric actuator. The piezoelectric actuator is coupled to the flux leveler and is configured to move the flux leveler in a direction perpendicular to a flat top surface of the flux plate.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An apparatus comprising:
   a flux plate having a top surface;
   a dipping cavity in the flux plate and recessed from the top surface;
   a flux leveler over the flux plate and configured to move in a direction parallel to the top surface, wherein the flux leveler comprises a metal frame configured to hold a flux and to slide relative to the flux plate;
   a first piezoelectric actuator configured to adjust a vertical distance formed between a bottom edge of the flux leveler and the top surface in response to a controlling voltage applied to electrodes of the first piezoelectric actuator; and
   a foot section directly attached to the first piezoelectric actuator, wherein the first piezoelectric actuator is configured to raise the metal frame in response to the controlling voltage, and wherein the foot section remains contacting the top surface when the metal frame is raised.

2. The apparatus of claim 1, wherein the first piezoelectric actuator is located on an outer side of an inner portion of the metal frame.

3. The apparatus of claim 1, wherein the first piezoelectric actuator is lower than and vertically aligned to an outer portion of the metal frame, and higher than and vertically aligned to at least a portion of the foot section.

4. The apparatus of claim 1, wherein the first piezoelectric actuator is attached to a first end of the metal frame, wherein the apparatus further comprises a second piezoelectric actuator attached to a second end of the metal frame, with the second end being opposite to the first end, and wherein the first and the second piezoelectric actuators are configured to adjust the tilt angle.

5. The apparatus of claim 4, wherein the first and the second piezoelectric actuators are coupled to different voltage sources.

6. The apparatus of claim 1, wherein the flux leveler comprises:
   a first and a second portion, each comprising a first end hold in position by a fixed axis, and a second end; and
   a movable arm comprising a first end attached to an end of the first piezoelectric actuator, and a second end connected to the second ends of the first and the second portions of the flux leveler, wherein the movable arm is configured to move in a direction perpendicular to the top surface of the flux plate.

7. The apparatus of claim 1, wherein the flux plate has a disk shape configured to rotate along an axis, and wherein the flux leveler is at a location located above the flux plate.

8. The apparatus of claim 7 further comprising arms coupled to the first piezoelectric actuator, wherein the first piezoelectric actuator is configured to push the arms with a length of the first piezoelectric actuator extending or contracting in response to the controlling voltage, and wherein the arms are configured to move the flux leveler in a direction perpendicular to the top surface.

9. The apparatus of claim 1 further comprising a voltage source coupled to, and configured to output variable voltages to, the electrodes of the first piezoelectric actuator.

10. An apparatus comprising:
    a flux plate comprising a flat top surface;
    a dipping cavity in the flux plate and recessed from the flat top surface; and
    a flux bowl which is bottomless and comprises:
       a metal frame including an inner portion contacting flux and a bottom edge of the inner portion contacting the flat to surface, wherein the flux bowl is configured to slide over the dipping cavity such that the bottom edge wipes away an excess portion of the flux over the dipping cavity during sliding;
       a first piezoelectric actuator mounted on the metal frame, wherein the first piezoelectric actuator is configured to extend in length in response to a controlling voltage applied to electrodes of the first piezoelectric actuator, and wherein the length is measured in a direction perpendicular to the flat top surface; and
       a foot section directly attached to the first piezoelectric actuator and contacting the flat top surface, wherein the first piezoelectric actuator is configured to gradually elevate the metal frame during sliding.

11. The apparatus of claim 10 further comprising:
    a flux leveler comprising a first and a second portion, each comprising a first end hold in position by a fixed axis, and a second end;
    a second piezoelectric actuator comprising a first end fixed onto the metal frame, wherein the first and the second piezoelectric actuators are configured to shape a top surface of the flux, so that the top surface of the flux is substantially flat and un-parallel to the flat top surface; and
    a movable arm comprising a first end attached to a second end of the second piezoelectric actuator, and a second end connected to the second ends of the first and the second portions of the flux leveler, wherein the movable arm is configured to move in a direction perpendicular to the flat top surface in response to a voltage applied to the second piezoelectric actuator.

12. The apparatus of claim 10, wherein the metal frame is configured to be raised by the first piezoelectric actuator in response to the controlling voltage to shape a top surface of the flux, so that the top surface of the flux is un-parallel to the flat top surface of the flux plate, with the foot section remaining contacting the flat top surface.

13. The apparatus of claim 10, wherein the flux bowl is configured to glide along a path crossing over the dipping cavity.

14. The apparatus of claim 10, wherein the first piezoelectric actuator is attached to a first end of the metal frame, and wherein the apparatus further comprises a second piezoelectric actuator attached to a second end of the metal frame, with the second end being opposite to the first end.

15. The apparatus of claim 14, wherein the first and the second piezoelectric actuators are on opposite sides of the dipping cavity when the flux bowl is directly over the dipping cavity, with a connecting direction between the first and the second piezoelectric actuators substantially perpendicular to a configured sliding direction of the metal frame.

16. The apparatus of claim 14, wherein the first and the second piezoelectric actuators are coupled to different voltage sources, and are configured to be applied with different voltages.

* * * * *